(12) United States Patent (10) Patent No.: US 7,698,640 B2
Krieglstein (45) Date of Patent: Apr. 13, 2010

(54) USER INTERACTIVE JOURNAL

(75) Inventor: Suruchi Krieglstein, Hercules, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 710 days.

(21) Appl. No.: 11/169,849

(22) Filed: Jun. 28, 2005

(65) Prior Publication Data

US 2006/0031245 A1 Feb. 9, 2006

Related U.S. Application Data

(60) Provisional application No. 60/599,087, filed on Aug. 4, 2004.

(51) Int. Cl.
*G06F 3/00* (2006.01)
*G09B 5/00* (2006.01)

(52) U.S. Cl. .................. 715/700; 345/901; 434/317

(58) Field of Classification Search ............ 715/901, 715/835, 700; 345/901, 173; 434/317, 365
See application file for complete search history.

(56) References Cited

U.S. PATENT DOCUMENTS

| | | | | | |
|---|---|---|---|---|---|
| 5,663,748 | A | * | 9/1997 | Huffman et al. | 345/173 |
| 5,761,485 | A | * | 6/1998 | Munyan | 715/839 |
| 6,288,753 | B1 | * | 9/2001 | DeNicola et al. | 348/586 |
| 6,396,481 | B1 | * | 5/2002 | Challa et al. | 345/169 |
| 6,502,756 | B1 | | 1/2003 | Fahraeus | |
| 6,551,107 | B1 | * | 4/2003 | Buckley et al. | 434/262 |
| 7,203,455 | B2 | * | 4/2007 | Ernst et al. | 434/317 |
| 7,245,483 | B2 | * | 7/2007 | Feague et al. | 361/683 |
| 7,353,453 | B1 | * | 4/2008 | Simmons | 715/268 |
| 2003/0016210 | A1 | * | 1/2003 | Soto et al. | 345/173 |
| 2003/0029919 | A1 | | 2/2003 | Lynggaard et al. | |
| 2003/0044759 | A1 | * | 3/2003 | Tanaka | 434/323 |
| 2004/0229195 | A1 | | 11/2004 | Marggraff et al. | |
| 2004/0243459 | A1 | * | 12/2004 | Geritz et al. | 705/10 |
| 2004/0246211 | A1 | | 12/2004 | Perkins et al. | |
| 2005/0131739 | A1 | * | 6/2005 | Rabinowitz et al. | 705/2 |
| 2006/0020931 | A1 | * | 1/2006 | Clarke | 717/138 |
| 2006/0088811 | A1 | * | 4/2006 | Park et al. | 434/362 |

FOREIGN PATENT DOCUMENTS

| | | |
|---|---|---|
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | WO 01/95559 A1 | 12/2001 |

OTHER PUBLICATIONS

Microsoft® Office Word 2003, screenshots 1-4.*

* cited by examiner

*Primary Examiner*—Ting Lee
(74) *Attorney, Agent, or Firm*—Townsend and Townsend and Crew LLP

(57) ABSTRACT

Apparatuses, systems and methods are provided for creating an interactive journaling experience for a user. The user is provided with apparatuses or systems which assist the user in generating a journal by providing interactive features such as suggestions, supportive statements, questions, instructions, and entertainment to enhance and develop the user's writing ability and interest in the journaling process.

11 Claims, 9 Drawing Sheets

USER INTERACTIVE JOURNAL

CROSS-REFERENCES TO RELATED APPLICATIONS

This application claims the benefit and priority of U.S. Provisional Patent Application No. 60/599,087, filed Aug. 4, 2004, the full disclosure of which is hereby incorporated by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Diaries and journals are used to record daily events and observations and to transcribe personal thoughts, dreams, emotions and travels through life. The word "journal" is derived from the words "journey" and "day." As one experiences each day, a journal can help to record the journey. Thus, journal writers have a ready made personal history recorded for themselves and future posterity.

In addition, the act of writing about feelings and emotions has been found to have personal benefits. Writing can allow the journal writer to express sadness, release anger, confront fear and examine wounds. Many doctors and psychologists suggest journal writing in the healing process because of the known health benefits of putting feelings on paper. A journal is also a place to express joy, produce a sense of accomplishment, explore talents, interests, passions, ask oneself questions and discover dreams.

Journal writing can also be of particular benefit to children and young adults. Children learn by writing and journal writing provides a medium to practice the skill of handwriting, vocabulary usage, grammar and spelling, to name a few. In addition, fluency grows from writing regularly and the fluency formed from frequent journal writing extends to other types of writing. Thus, journal writing becomes the source for more extended writing.

Older children may use journal writing to find out more about themselves. As they record their thoughts and feelings, children will be more absolute in their concept of self, their belief systems, and their self confidence. Creative energies may also be unleashed through journal writing. Creativity is an often untapped and underutilized aspect of the human capacity. Children will often be surprised at just how much creative energy they possess when given the chance to express it. Journal writing can also provide a temporary escape from the trials of the world. The pages upon which children record their thoughts do not judge, and the recording process is an avenue whereby children can take control.

Traditionally, diaries and journals are books which provide plain pages for writing. The books may be hardcover, soft cover, hardbound, or spiral bound. The pages may be blank or lined. Various decorations may be present to appeal to the user or to provide inspirations. More recently, electronic journal writing has become popularized. Electronic journals are typically computerized versions of traditional diaries and journals. Instead of manually writing on a sheet of paper, the user types into a word processing program. Such computerization may assist in manipulating the text and/or sorting the information in a more efficient manner. Electronic journals may also be posted on the internet in the form of weblogs or "blogs" for private or public viewing.

However, regardless of the decorations on a journal page or the excitement of setting up a public weblog, traditional and electronic journals are often left blank or abandoned by the user. Often this is due to "writer's block" wherein the user is has a psychological inability to begin or continue work on a piece of writing. This may be due to fear, waning interest or the inability to think of something to write about. This may be particularly true for children who are just beginning the process of expressing thoughts and ideas in written form. Children may particularly desire assistance in formulating their journal writing, maintaining focus and attention to the generation journal entries, and maintaining interest in continuing to write in the journal.

Embodiments of the invention address the above problems and other problems, individually and collectively.

BRIEF SUMMARY OF THE INVENTION

The present invention provides apparatuses, systems and methods for creating an interactive journaling experience for a user. The user is provided with apparatuses or systems which assist the user in generating a journal by providing interactive features such as suggestions, supportive statements, questions, instructions, and entertainment to enhance and develop the user's writing ability and interest in the journaling process.

In a first aspect of the present invention, an interactive journaling system is provided. In some embodiments, the system includes a journaling base having at least one category icon wherein each category icon indicates a journaling subject. The journaling base can have any form, however the journaling base typically has the shape of a book to resemble a traditional journal. Examples of such journaling subjects represented by category icons include "Good Day", "Bad Day", "Ask Me", "Crush", "Friends", "Dad", "Mom", "Brother", "Sister", "Family", "Homework", "School", "Secret", "Cool", "Trouble", "Crying", "Money", "Kiss and Tell", "Vacation", "Holiday", "Goals", "Exercise", "Health", "Sleep", "Movies", "Music", "Books", "Theatre", "Birthday", "Food", "Proud", "Happy", "Excited", "Relaxed", "Love Struck", "Inspired", "Surprised", "Mischievous", "Curious", "Silly", "Sorry", "Angry", "Scared", "Worried", "Jealous", "Confused", "Bored", "Depressed", "Overwhelmed", and "Sick", to name a few. A category icon can be selected by the user to select the journaling subject that the user would like to write about. In addition, the system includes a stylus housing, a processor coupled to the stylus housing, and a selector or selection device disposed within the stylus housing and operatively coupled to the processor, wherein the selection device is used to select the at least one category icon by manipulation of the stylus housing. Further, the system also includes a memory unit operatively coupled to the processor comprising (i) computer code for recognizing the selection of the at least one category icon, and (ii) computer code for generating at least one output related to the journaling subject of the selected category icon. And, the system also includes an output device operatively coupled to the processor.

Typically, the output device includes an audio output device and the at least one output comprises an audio output. Thus, the user hears auditory prompts or messages based on the selections made. For example, the audio output may comprise a question related to the journaling subject that has been selected. It may be appreciated, however, that the at least one output may be audio, visual, tactile or a combination of these. In addition, the processor, the memory unit, and the audio output device may be disposed in various locations, such as in the stylus housing or in the journaling base. As mentioned, the journaling base typically has the form of a book, however any form may be used such as rectangular block, a circular disk, a dome, to name a few. Further, the journaling base may be comprised of a bookmark, either alone or tether to/used in combination with a book-shaped form.

Various types of selectors or selection devices may be used to select the category icons and other elements provided by the interactive journaling system. In some embodiments, the selection device includes an optical emitter and an optical detector. This is particularly applicable to journaling systems of the present invention which utilize substantially invisible codes that are readable by such a selection device. When the substantially invisible codes are disposed near the at least one category icon, the at least one category icon may be selected by reading the substantially invisible codes with the use of the selection device. The optical emitter and optical detector can also be used for character recognition. The user may generate graphic elements that such a scanning device can recognize. Thus, the memory unit may include code for correlating a user generated graphic element to a character. This can allow the user to create their own category icons or functional elements. In addition, this scanning ability can be used to allow the journaling system to recognize letters, words, sentences, numbers or symbols generated by the user with a writing element. This can enhance the interactive features of the journaling system. In other embodiments, the journaling base comprises an electrographic position location apparatus which includes a plurality of first antenna elements. In these embodiments, the selector or selection means comprises a second antenna element. Thus, together the antenna elements comprise signal transmitting and signal receiving antenna elements.

In addition, the interactive journaling system typically includes at least one article that is writeable on by a writing element. Thus, the article may be comprised of a sheet of paper, such as a page of a journal. When the journaling base has the form of a book having a front cover and a back cover, the article may have the form of a page disposed between the front cover and the back cover. Further, the at least one category icon may be disposed on an inside surface of the front cover or the back cover facing the at least one article. The article may include substantially invisible codes on the article, and wherein the memory unit comprises computer code for recognizing the substantially invisible codes. In some embodiments, the substantially invisible codes are in the form of dot codes and optionally encode a relative or absolute position.

In some embodiments, the interactive journaling system further comprises a control panel having at least one control panel icon selectable by the selection device. Each control panel icon indicates a function, and the memory unit includes computer code for recognizing selection of the at least one control panel icon and computer code for performing the function. Thus, typical the control panel icons include a help icon, an audio-ON icon, an audio-OFF icon and a repeat icon.

In other embodiments, the interactive journaling system of the present invention includes at least one category icon, each category icon indicating a journaling subject, and each category icon having an associated substantially invisible code (such as a dot code). The system further includes a stylus housing, a processor coupled to the stylus housing, and a selection device disposed within the stylus housing and operatively coupled to the processor. The selection device is used to select the at least one category icon by reading the associated substantially invisible code. The system also includes a memory unit operatively coupled to the processor comprising (i) computer code for recognizing the selection of the at least one category icon, and (ii) computer code for generating at least one output related to the journaling subject of the selected category icon, and an output device operatively coupled to the processor.

In some embodiments, the system further comprises at least one sticker having the at least one category icon or print element and associated substantially invisible code disposed thereon. Thus, the stickers can be affixed to a variety of surfaces as desired by the user. Since the codes are disposed thereon, the category icons or print elements on the stickers can be selected and recognized regardless of their affixed location. Alternatively or in addition, the system may further comprise at least one sheet having the at least one category icon and associated substantially invisible code disposed thereon. For example, the at least one sheet may have the form of a bookmark.

Again, the system may further comprise at least one article that is writeable on by a writing element. For example, the at least one article may have the form of a page of a journal. The page may have an area for writing that has substantially invisible codes disposed thereon so that stroke marks written in the area are associated with the substantially invisible codes. The memory unit may then further comprise computer code for correlating the stroke marks to at least one character. The at least one character may include letters, numbers, symbols, words, or sentences. Thus, when the substantially invisible codes encode a relative or absolute position, the system is able to recognize the stroke marks and identify the writings of the user in the journaling system. Such writings may then be used to further develop the interactive aspects of the journaling system.

In a second aspect of the present invention, methods are provided for using the interactive journaling system. In one embodiment, the method includes providing an interactive journaling system including at least one category icon wherein each category icon indicates a journaling subject, and a selection means, wherein the selection means is capable of selecting the at least one category icon. The method further includes selecting one of the at least one category icons with the selection means and receiving an output related to the journaling subject of the selected category icon.

The output may comprise a variety of suggestions, supportive statements, questions, instructions, or entertainment for the user. Typically, such outputs are audio outputs. In some embodiments, the output comprises a yes/no question about the selected journaling subject. When the interactive journaling system further comprises a Yes print element and a No print element, the method may further comprise selecting the Yes print element or the No print element with the selection device. In other embodiments, the output comprises an open-ended statement or question about the journaling subject. The user may then write in response to the open-ended statement or question. Once the user had completed a segment of writing, the user may then select an element with the selection means indicating that the writing step has completed. The user may then receive an additional output comprising a different statement or question about the journaling subject in response to selecting the element indicating that the writing step has completed. Or, the user may select a different category icon with the selection means and receive an output related to the journaling subject of the different category icon.

In another embodiment, the method comprises providing an interactive journaling system including at least one category icon which indicates a stepped process, and a selection device, wherein the selection device is capable of selecting the at least one category icon. The method further includes selecting the at least one category icon with the selection means and receiving an output comprising a prompt to create a user generated graphic element symbolizing a step of the stepped process.

The user generated graphic element may comprises a number representing a step number of the stepped process. Examples of such numbers include one, two, three, four, and five. Thus, the method may further comprise generating the user generated graphic element and selecting the user generated graphic element with the selection device. The method may also further comprise receiving an output comprising a prompt to write the step of the stepped process associated with the user generated graphic element in response to selecting the user generated graphic element. To continue developing the stepped process, the user may then receive an output comprising a prompt to create another user generated graphic element symbolizing a next step of the stepped process. The method further comprising generating the another user generated graphic element and selecting the another user generated graphic element with the selection device. And, further receiving an output comprising a prompt to write the next step of the stepped process associated with the another user generated graphic element in response to selecting the another user generated graphic element. When starting with a first step of a stepped process, the user generated graphic element would comprise the number one and the another user generated graphic element would comprise the number two. Such methods are typically used to plan out steps to achieve a goal. Thus, the at least one category icon may comprise a goal category icon and the stepped process comprises steps to achieve a goal.

Other objects and advantages of the present invention will become apparent from the detailed description to follow, together with the accompanying drawings.

DETAILED DESCRIPTION OF THE INVENTION

Figure 1A:
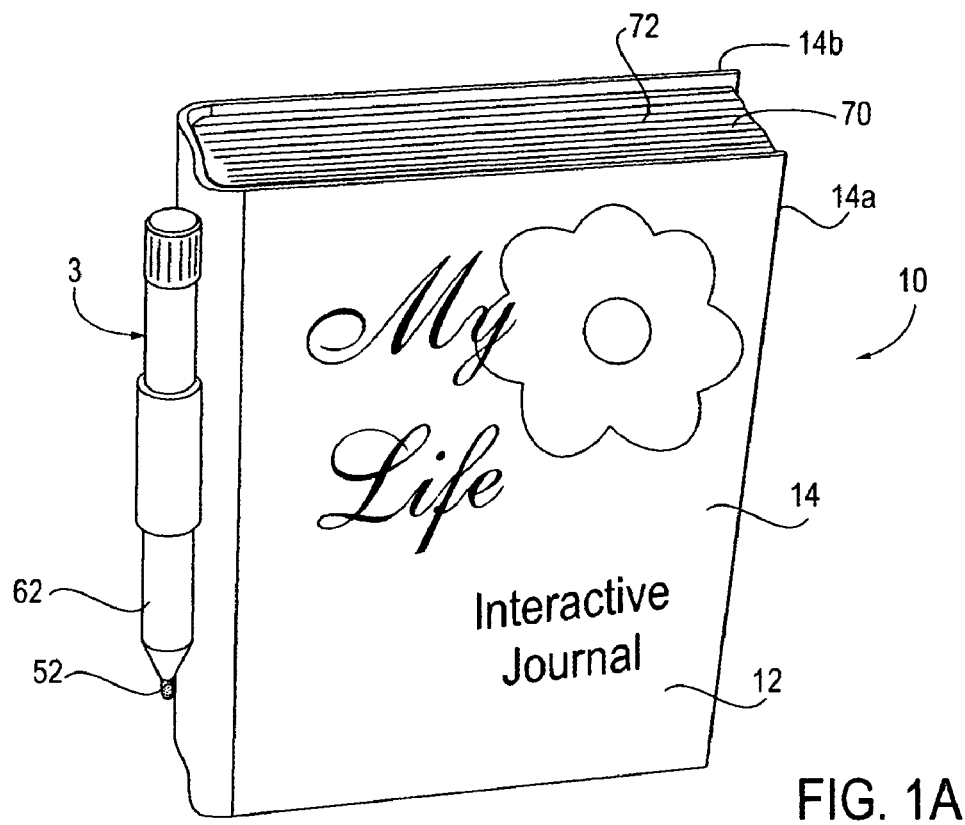
FIGS. 1A-1B illustrate an embodiment of an interactive journaling system of the present invention.
Figure 1B:
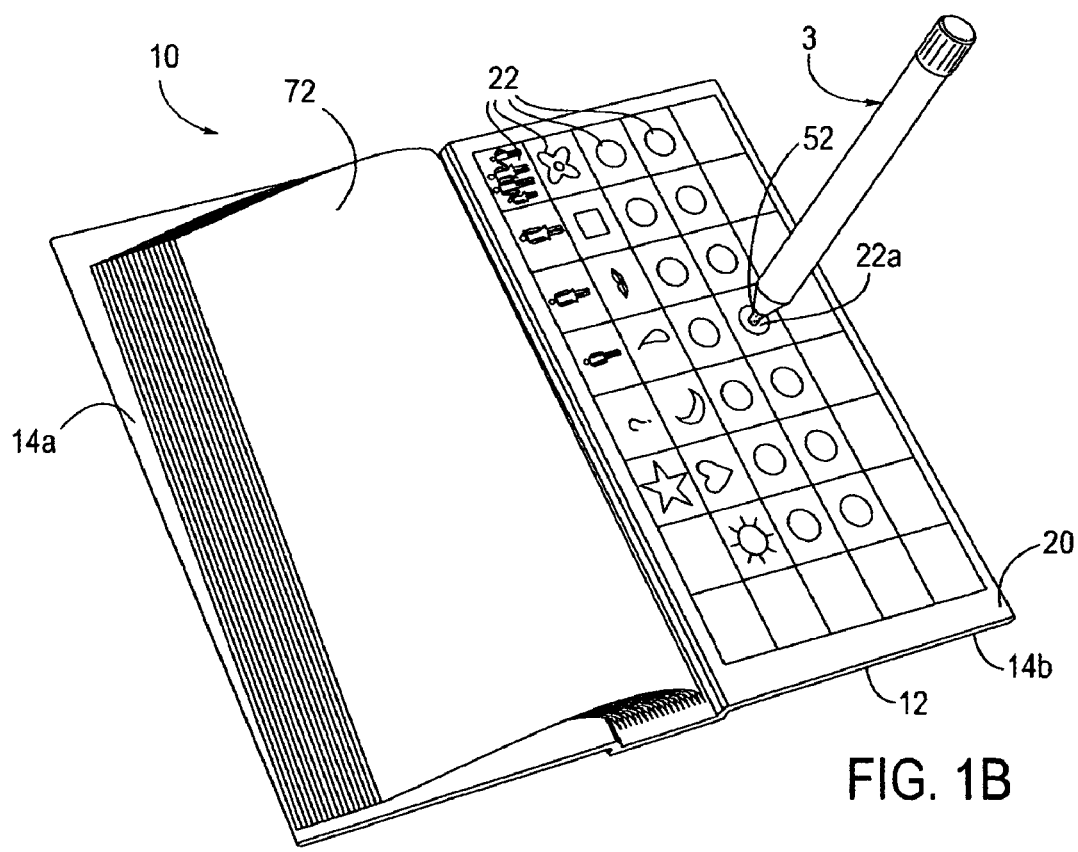

Referring to FIGS. 1A-1B, an embodiment of an interactive journaling system 10 of the present invention is illustrated. Here, the interactive journaling system 10 comprises a journaling base 12 in the form of a book 14 having a front cover 14a and a back cover 14b so as to appear similar to a traditional hardbound journal. The base 12 is shown in a closed position in FIG. 1A. A stylus 3 having a stylus housing 62 is shown mounted in a holder 16 on the base 12. Here, the stylus 3 includes a writing element 52 for writing on one or more articles 70, in this case pages 72 of the book 14.

FIG. 1B illustrates the base 12 in an opened position. Here, the pages 72 are shown turned to the left side of the book 14 to expose an inside surface 20 of the back cover 14b. A plurality of category icons 22 are shown disposed on the inside surface 20. Each category icon 22 represents a journaling subject, such as "Friends", "Family", "Crush", "School", "Vacation", "Birthday", "Movies", "Food", "Happy", "Depressed", "Sick", "Angry", "Scared", to name a few. A category icon 22 can be selected by the user to select the journaling subject that the user would like to write about on the pages 72. A selection device (not shown) is disposed within the stylus housing 62 so that a category icon 22 is selectable by manipulation of the stylus 3, such as by holding a portion of the stylus 3 near the desired category icon 22a, as shown. The selection device is operatively coupled to a processor. A memory unit is also operatively coupled to the processor, the memory unit comprises (i) computer code for recognizing the selection of the at least one category icon 22, and (ii) computer code for generating at least one output related to the journaling subject of the selected category icon 22. An output device is also operatively coupled to the processor which provides the output to the user. Typically, the output is audio output so the user hears a phrase or question when a category icon 22 has been selected. For example, if the "Movie" category icon 22 is selected, the user may hear the question "Did you recently see a movie?", "What was the name of the movie you saw?" or "What is your favorite movie?". These audio outputs prompt the user to write in the interactive journaling system 10 about the chosen journaling subject.

In some embodiments, the interactive journaling system 10 is able to receive input from the user by the user writing on the pages 72. For example, the pages 72 may include substantially invisible codes that encode a relative or absolute position on each page 72. When written markings are made on the page 72, various marking may be associated with different codes. The markings may then be recognized and remembered by the system 10 to enhance and personalize the journaling process. Such substantially invisible codes may also be used in the selection of the category icons.

These and other features of the interactive journaling system 10 will be further described below.

I. Substantially Invisible Codes

The selection device disposed within the stylus housing 62 may be comprised of an optical emitter and an optical detector which are used to identify substantially invisible codes present on the journaling base 12. In particular, the codes may be present on or near the category icons 22 of the journaling base 12. Thus, when selecting a category icon 22 with the stylus 3, the selection device disposed within the stylus 3 is able scan and identify the associated substantially invisible code. Alternatively or in addition, when the base 12 includes an article 70, such as journal pages 72, the substantially invisible codes may be present on the pages 72. Thus, when writing on the pages 72 with the stylus, the selection device disposed within the stylus 3 is able to select and identify specific markings made by the user on the page 72.

Interactive apparatuses using such substantially invisible codes are described in U.S. Patent Application Ser. Nos. 60/456,053, filed Mar. 18, 2003, and Ser. No. 10/803,803 filed on Mar. 17, 2004, which are herein incorporated by reference in their entirety for all purposes. These interactive apparatus may include an optical emitter and an optical detector operatively coupled to a processor. The interactive apparatus can optically scan substantially invisible codes on an article having a surface having a plurality of positions. Different codes are respectively at the plurality of positions and may relate to the locations (e.g., the relative or absolute spatial coordinates) of the plurality of positions on the surface. A user may form graphic elements such as print elements at the positions and/or pre-printed print elements may exist at those positions.

The codes are "substantially invisible" to the eye of the user and, as stated, may correspond to the absolute or relative locations of the print elements on the page. "Substantially invisible" also includes codes that are completely or slightly invisible to the user's eye. For example, if codes that are slightly invisible to the eye of a user are printed all over a sheet of paper, the sheet may appear to have a light gray shade when viewed at a normal viewing distance. In some cases, after the user scans the codes with the interactive apparatus, an audio output device in the interactive apparatus produces unique audio outputs (as opposed to indiscriminate audio outputs like beeping sounds) corresponding to graphic elements that are associated with the codes.

Preferably, the substantially invisible codes are embodied by dot patterns. Technologies that read visible or "subliminally" printed dot patterns exist and are commercially available. These printed dot patterns are substantially invisible to the eye of the user so that the codes that are present in the dot patterns are undetectable by the user's eyes in normal use (unlike normal bar codes). The dot patterns can be embodied by, for example, specific combinations of small and large dots that can represent ones and zeros as in a binary coding. The dot patterns can be printed with ink that is different than the ink that is used to print the print elements, so that the interactive apparatus can specifically read the dot patterns.

Anoto, a Swedish company, employs a technology that uses an algorithm to generate a pattern the enables a very large unique data space for non-conflicting use across a large set of documents. Their pattern, if fully printed, would cover 70 trillion 8.5"×11" pages with unique recognition of any 2 cm square on any page. Paper containing the specific dot patterns is commercially available from Anoto. The following patents and patent applications are assigned to Anoto and describe this basic technology and are all herein incorporated by reference in their entirety for all purposes: U.S. Pat. No. 6,502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 00/73983, and WO 01/16691.

In some embodiments, the dot patterns may be free of other types of data such as data representing markers for data blocks, audio data, and/or error detection data. As noted above, the processor in the interactive apparatus can determine the location of the stylus using a lookup table, and audio can be retrieved and played based on the location information. This has advantages. For example, compared to paper that has data for markers, audio, and error detection printed on it, embodiments of the invention need fewer dots, since data for markers, audio, and error detection need not be printed on the paper. By omitting, for example, audio data from a piece of paper, more space on the paper can be rendered interactive, since actual audio data need not occupy space on the paper. In addition, since computer code for audio is stored in the interactive apparatus in embodiments of the invention, it is less likely that the audio that is produced will be corrupted or altered by, for example, a crinkle or tear in the sheet of paper.

Although dot patterned codes are specifically described herein, other types of substantially invisible codes may be used in other embodiments of the invention. For example, infrared bar codes could be used if the bar codes are disposed in an array on an article. Illustratively, a sheet of paper may include a 100×100 array of substantially invisible bar codes, each code associated with a different x-y position on the sheet of paper. The relative or absolute locations of the bar codes in the array may be stored in the memory unit in the interactive apparatus.

As noted, in preferred embodiments, the substantially invisible codes may directly or indirectly relate to the locations of the plurality of positions and/or any print elements any surface. In some embodiments, the substantially invisible codes can directly relate to the locations of the plurality of positions on a sheet of paper (or other article). In these embodiments, the locations of the different positions on the sheet may be provided by the codes themselves. For example, a first code at a first position may include code for the spatial coordinates (e.g., a particular x-y position) for the first position on the sheet, while a second code at a second position may code for the spatial coordinates of the second position on the sheet. Different graphic elements such as user-generated print elements can be at the different positions on the sheet. These print elements may be formed over the codes. For example, a first print element can be formed at the first position overlapping the first code. A second print element can be formed at the second position overlapping the second code. When a user forms the first print element, the scanning apparatus recognizes the formed first print element and substantially simultaneously scans the first code that is associated with the formed first print element. A processor in the interactive apparatus can determine the particular spatial coordinates of the first position and can correlate the first print element with the spatial coordinates. When the user forms the second print element, the scanning apparatus recognizes the formed second print element and substantially simultaneously scans the second code. A processor can then determine the spatial coordinates of the second position and can correlate the second print element with the spatial coordinates. A user can then subsequently select the user-formed first and second print elements using the interactive apparatus, and the interactive apparatus can perform additional operations.

Figure 2:
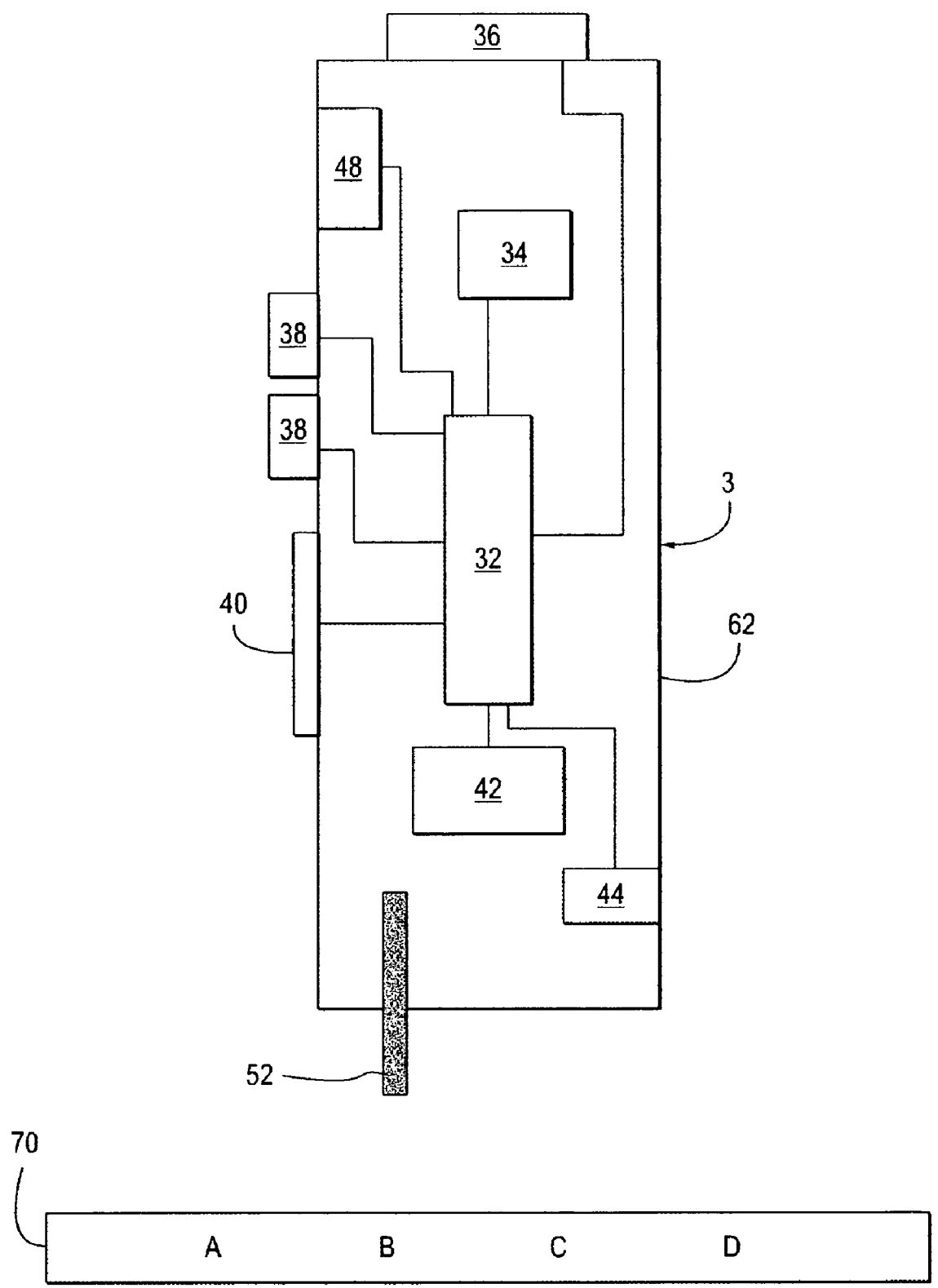
FIG. 2 illustrates an embodiment of a stylus interacting with an article.

II. Embodiment of Interactive Journaling System Using Substantially Invisible Codes FIG. 2 illustrates an embodiment of an interactive apparatus or stylus 3 interacting with an article 70. The stylus 3 includes a processor 32 inside of a stylus housing 62. The stylus housing 62 may be coupled, directly or through intervening physical structures, to the processor 32. The stylus 3 also includes an audio output device 36 and a display device 40 coupled to the processor 32. The audio output device 36 can include a speaker or an audio jack (an earphone or headphone jack). The display device 40 can include an LCD (liquid crystal display), or any other suitable display device. A device for providing tactile feedback (not shown) may also be present in the stylus housing 62.

In some embodiments, the display device 40 can be physically coupled to the stylus housing 62. In other embodiments, the display device 40 can be separated from the other parts of the stylus 3 and may communicate with the other parts by a wireless data transmission mechanism (e.g., an IR or infrared signal data transmission mechanism). Such separated display devices 40 can provide the user with the ability to see any visual feedback produced by his or her interaction with the system 10.

Input buttons 38 may be present and electrically coupled to the processor 32 to allow a user to input information (such as start, stop, or enter) into the stylus 3 and/or turn the stylus 3 on and off. A power source 34 such as a battery may be disposed in the housing 62 to supply electricity to the processor 32 and other components of the system 10.

An optical emitter 44 and an optical detector 42 are disposed at one end of the stylus 3. The optical emitter 44 and the optical detector 42 are coupled to the processor 32. The optical emitter 44 may be, for example, an LED (light emitting diode) or other light source, while the optical detector 42 may comprise, for example, a charge coupled device.

The processor 32 may include any suitable electronics to implement the functions of the system 10. For example, the processor 32 may include a microprocessor with speech synthesizing circuitry for producing synthesized speech, amplifier circuits for amplifying the speech, circuitry for controlling any inputs to the system 10 and any outputs provided by the system 10, as well as an analog-to-digital converter to convert signals received from the optical detector 42 into digital signals.

A memory unit 48 is also present in the stylus 3. The memory unit 48 is coupled to the processor 32. The memory unit 48 may be a removable memory unit such as a ROM or flash memory cartridge. In other embodiments, the memory unit 48 may comprise one or more memory units (e.g., RAM, ROM, EEPROM, etc.) that are completely internal to the housing 62. In other embodiments, the memory unit 48 may comprise the combination of two or more memory devices internal and/or external to the stylus housing 62.

The memory unit 48 may comprise any suitable magnetic, electronic, electromagnetic, optical or electro-optical data storage device. For example, one or more semiconductor based devices can be in a memory unit 48.

The memory unit 48 comprises computer code for performing any of the functions of the interactive journaling system 10. For example, the memory unit 48 may comprise computer code for recognizing printed characters, computer code for recognizing a user's handwriting and interpreting the user's handwriting (e.g., handwriting character recognition software), computer code for correlating positions on an article with respective print elements, code for converting text to speech (e.g., a text to speech engine), etc. Software for converting text to speech is commercially available from a number of different vendors. The memory unit 48 may also comprise code for audio and visual outputs. For example, code for sound effects, code for saying words, code for questions, etc. may all be stored in the memory unit 48. Code for audio outputs such as these may be stored in a non-volatile memory (in a permanent or semi-permanent manner so that the data is retained even if the interactive apparatus is turned off), rather than on the article itself. Computer code for these and other functions described in the application can be included in the memory unit 48, and can be created using any suitable programming language including C, C++, etc.

A writing element 52 is at the same end of the stylus 3 as the optical emitter 44 and the optical detector 42. The writing element 52 may comprise a marker, crayon, pen or pencil and may or may not be retractable. If it is retractable, then the writing element 52 may be coupled to an actuator. A user may actuate the actuator to cause the writing element to extend outward from or retract into the stylus housing. When it is used, a user can hold the stylus 3 and use it to write on a sheet of paper, such as a journal page 72. The user's markings may also be scanned using the optical emitter 44 and the optical detector 42 and the processor 32 may interpret the user's writing.

The article 70 illustrated in FIG. 2 is two-dimensional and may represent, for example, the inside surface 20 of the back cover 14b of the interactive journaling system shown in FIG. 1B having category icons 22 thereon. In FIG. 2, the letters A, B, C, and D represent different positions on the article 70. The different positions A, B, C, and D on the article 70 can have different codes (not shown) and different print elements, such as category icons 22 (not shown). In this example, the codes and the category icons overlap at positions A, B, C, and D. The different codes are substantially invisible to the eye of the user, and a user is unable to see the codes with the user's eyes in normal use.

Illustratively, the user may select a category icon at position A by scanning the codes at position A with the stylus 3. The optical emitter 44 produces a light signal which is reflected off of the substantially invisible code at position A and is received by the optical detector 42. The processor 32 determines the location of the position A and retrieves audio that corresponds to the category icon from the memory unit 48 and/or performs a function related to the category icon. For example, if the "? Ask Me" category icon is selected, the processor 32 may cause the audio output device 36 to recite "What is your biggest talent?". In some embodiments, rescanning of the category icon at position A causes the audio output device 36 to produce a different question, such as "If you could live anywhere in the world, where would it be?". This allows the user to cycle through a variety of questions until a question is provided that the user would like to answer or write about in the journaling system. Such questions may be provided in a random or ordered sequence.

Alternatively, the article 70 illustrated in FIG. 2 may represent, for example, a journal page 72 of the interactive journaling system 10. Again, the letters A, B, C, and D represent different positions on the article 70. The different positions A, B, C, and D on the article 70 can have different codes (not shown) and different print elements (not shown). In this example, the codes and the codes and the print elements may overlap at positions A, B, C, and D. The different codes are substantially invisible to the eye of the user, and a user is unable to see the codes with the user's eyes in normal use.

In some embodiments, the user can create their own category icons by creating specific graphic elements on a page 72. For example, the user may draw a question mark "?" on the article 70 with the writing element 52 to create a user-generated category icon similar to the "? Ask Me" category icon described above. The question mark "?" (not shown in FIG. 2) is drawn at position A over a substantially invisible code at position A. When the user selects and scans the question mark "?", the optical emitter 44 produces a light signal which is reflected off of the substantially invisible code at position A and is received by the optical detector 42. The processor 32 determines the location of the position A and retrieves audio that corresponds to the question mark "?" from the memory unit 48 and/or performs a function related to the question mark "?". For example, after the interactive stylus 3 is used to select the question mark "?" and after it scans the substantially invisible code at position A, the processor 32 may shift the interactive journaling system 10 to a listing mode, whereby a user may scroll through a list of questions and may select a question. The processor 32 may cause the audio output device 36 to produce a list of questions for the user after each successive selection of the question mark "?". For instance, a first selection of the question mark "?" with the stylus 3 may cause the audio output device 36 to recite "What is your biggest talent?", a second selection of the question mark "?" with the stylus 3 may cause the audio output device 36 to recite "If you could live anywhere in the world, where would it be?", etc. Each subsequent selection of the created graphic element can cause the system 10 to recite a different question in the listing. Thus, the user-generated category icons function similarly to the provided category icons. In addition to creating user-generated category icons, the codes on the journal pages 72 may be used to provide a variety of interactive features which will be described in more detail in later sections.

The writing element 52 can be used to write letters, words, numbers or symbols on various locations on the article 70. Using appropriate handwriting recognition and/or optical character recognition software (which may be stored as computer code in the memory unit 48), a user's writing can be interpreted by the processor 32 so that the processor 32 can determine what the user wrote and also the particular location of the position where the user is writing. As explained in further detail below, using this information, the system can be adapted to perform more personalized interactions.

Figure 3:
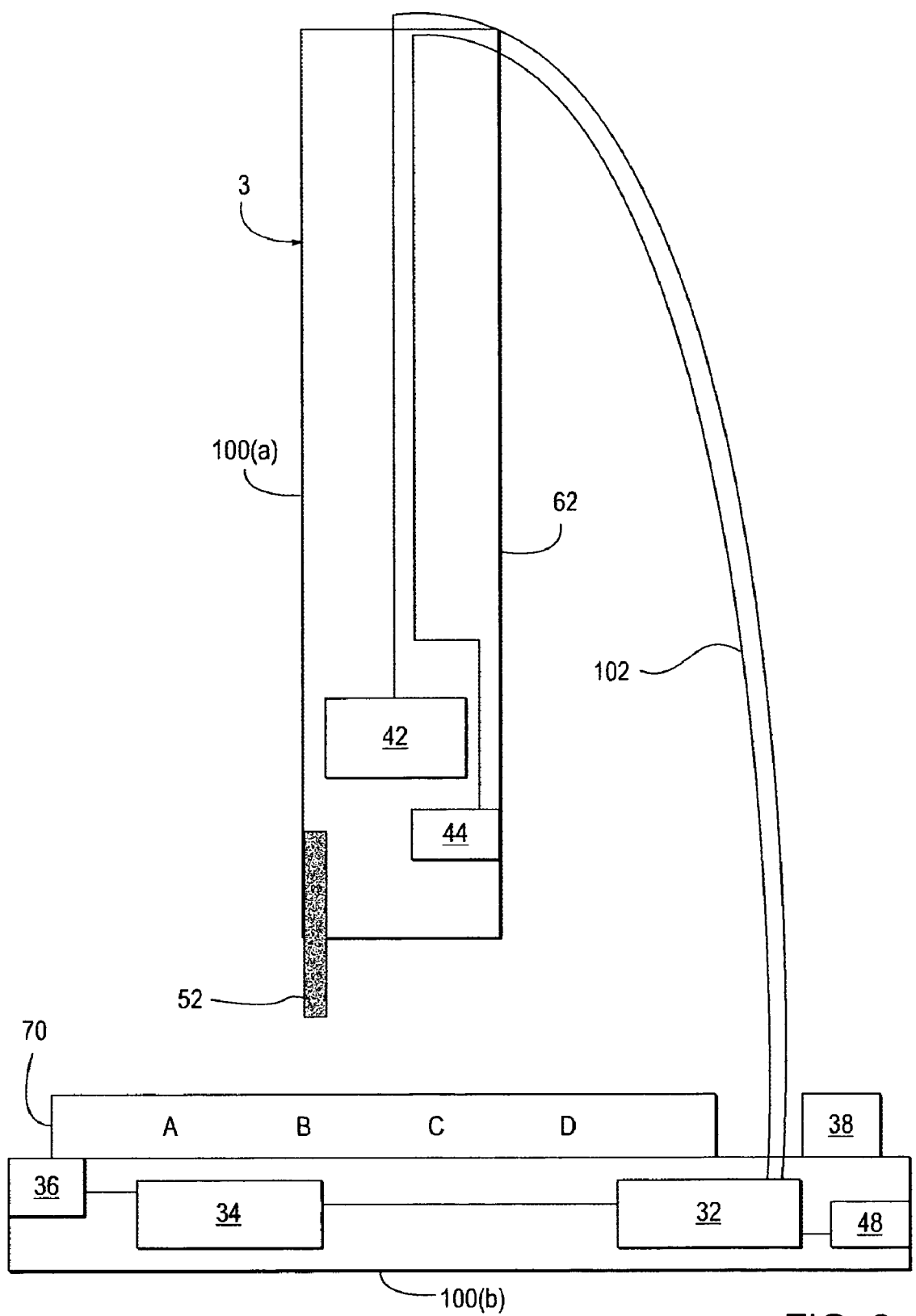
FIG. 3 illustrates another embodiment of the stylus and other portions of an interactive journaling system of the present invention.

FIG. 3 shows another embodiment of the stylus 3 and other portions of the interactive journaling system 10. In this example, like numerals designate like elements and the previous descriptions of like elements need not be repeated. However, in this embodiment, the system 10 includes a stylus 100(a) and a platform 100(b). A cable 102 couples the platform 100(b) to the stylus 100(a). The platform 100(b) supports the two-dimensional article 70. Thus, the platform 100(b) represents the journaling base and which supports the article 70 or page of the journal. In this embodiment, the processor 32, the power source 34, the audio output device 36, buttons 38, and the memory unit 48 are in the platform 100(b) instead of the stylus 100(a). In other embodiments, it is possible to not have a cable and there can be a wireless link between the stylus 100(a) and the platform 100(b) (or other base unit). In the embodiment shown in FIG. 3, there are fewer electronic components in the stylus 100(a), so that the stylus 100(a) can be made less bulky than the stylus 3 shown in FIG. 2.

Figure 4:
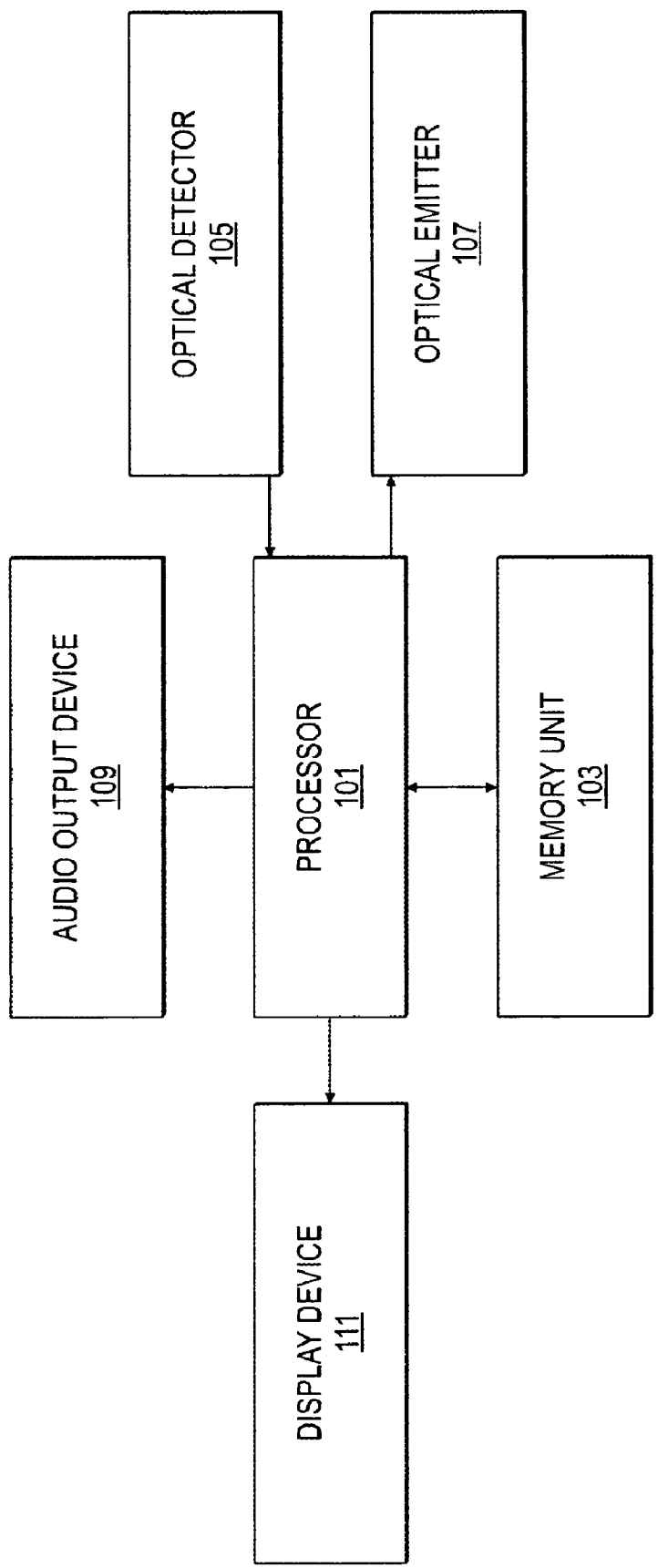
FIG. 4 provides a block diagram of some electrical components that can be used in the interactive journaling system according to an embodiment of the invention.

FIG. 4 shows a block diagram of some electrical components that can be used in an interactive journaling system 10 according to an embodiment of the invention. The system 10 may include a processor 101 and a memory unit 103 coupled to the processor 101. The processor 101 and the memory unit 103 may be embodied by one or more computer chips, alone, or in combination with one or more removable memory storage devices (e.g., memory sticks, memory cards, etc.). In some embodiments, the processor 101 may include an application specific circuit, and a speech synthesizer may be associated (e.g., within or coupled to the processor) with the processor 101. An optical detector 105 and an optical emitter are also operatively coupled to the processor 101. Output devices such as a display device 111 (e.g., an LCD or LED screen) and an audio output device 109 (e.g., a speaker or an earphone) may also be coupled to the processor 101. Additional exemplary details relating to these components are provided above and below.

III. Embodiments of Interactive Journaling System Using other Selection Devices

Although interactive journaling systems with optical emitters and optical detectors are described in detail, the interactive journaling systems may take other forms and need not include an optical emitter and an optical detector. For example, in some embodiments, the interactive journaling system may be in the form of a tablet computer such as a tablet PC or a personal digital assistant (PDA) that uses a stylus. Such devices are commercially available. The memory unit in the tablet PC or PDA can have computer code for performing any of the functions described in this application. Graphic elements can be created in a liquid crystal display, and the user can thereafter interact with those created graphic elements in the manner described herein. In these embodiments, the stylus may or may not include active electronics. For example, the technology present in many PDAs can be used so that styluses without any electronics can be used in some embodiments of the invention.

In yet other embodiments, the interactive journaling system can be of the type described in U.S. patent application Ser. No. 10/457,981, filed on Jun. 9, 2004, and U.S. Provisional Patent Application No. 60/575,557, filed on May 28, 2004, which are both incorporated herein by reference. In these embodiments, the interactive journaling system includes an electrographic position location apparatus with a platform comprising a surface, a processor, a plurality of first antenna elements, and an audio output device such as a speaker. A stylus including a second antenna element and a writing instrument can be coupled to the platform. The first antenna elements may be signal transmitting antenna elements and the second antenna element may be a signal receiving antenna element (or vice-versa). A sheet of blank paper (without substantially invisible codes) or a sheet having pre-printed category icons can be present on the platform at a pre-defined position. The first antenna elements may transmit different signals (e.g., signals with different amplitudes) at different x-y positions on the surface (and therefore the sheet of paper) and these different signals can be received by the second antenna element in the stylus. A first antenna element and a second antenna element can thus be capacitively coupled together through the paper. Thus, when the user touches a pre-printed category icon or creates a graphic element on the sheet of paper, a processor can determine the position of the category icon or element being created.

As described in U.S. Provisional Patent Application No. 60/575,557, filed on May 28, 2004 (which is herein incorporated by reference in its entirety), the processor can also determine what category icon or graphic element is being selected or created using commercially available character recognition software. As is described therein, character recognition software is commercially available from Xpert Eye, Inc. of Sammamish, Wash. (www.experteye.com) and Vision Objects, Inc. of Paris, France. Software such as the type sold by these entities can be used in any of the interactive journaling systems described herein. When this software is used in an electrographic position location apparatus (or any other interactive journaling system embodiment described herein) that uses paper, the software is able to recognize graphic elements that are created by the user on that piece of paper. As will be apparent from the many examples below, by determining the graphic elements created by the user and determining the positions of those graphic elements, a number of useful functions can be performed by the interactive journaling system.

IV. Category Icons

Figure 5:
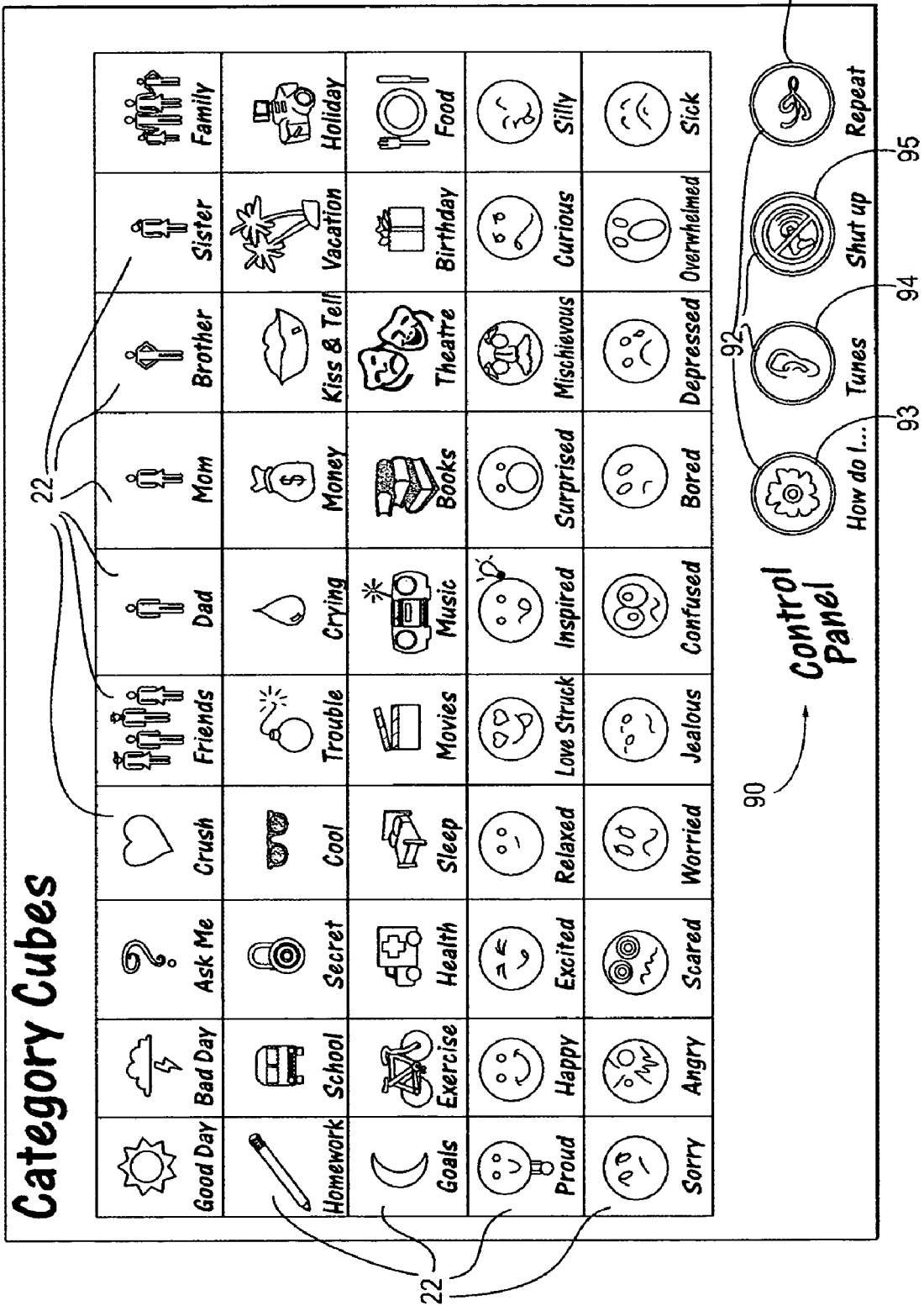
FIG. 5 illustrates a variety of category icons.

FIG. 5 illustrates a variety of sample category icons 22 that may be present as part of the interactive journaling system 10. As previously shown in FIG. 1B, the category icons 22 may be disposed on the inside surface 20 of the back cover 14b of the journal book 14. Each category icon 22 represents a journaling subject, such as "Friends", "Family", "Crush", "School", "Vacation", "Birthday", "Movies", "Food", "Happy", "Depressed", "Sick", "Angry", "Scared", to name a few. A category icon 22 can be selected by the user to select the journaling subject that the user would like to write about on the pages 72 of the journal book 14.

Figure 6:
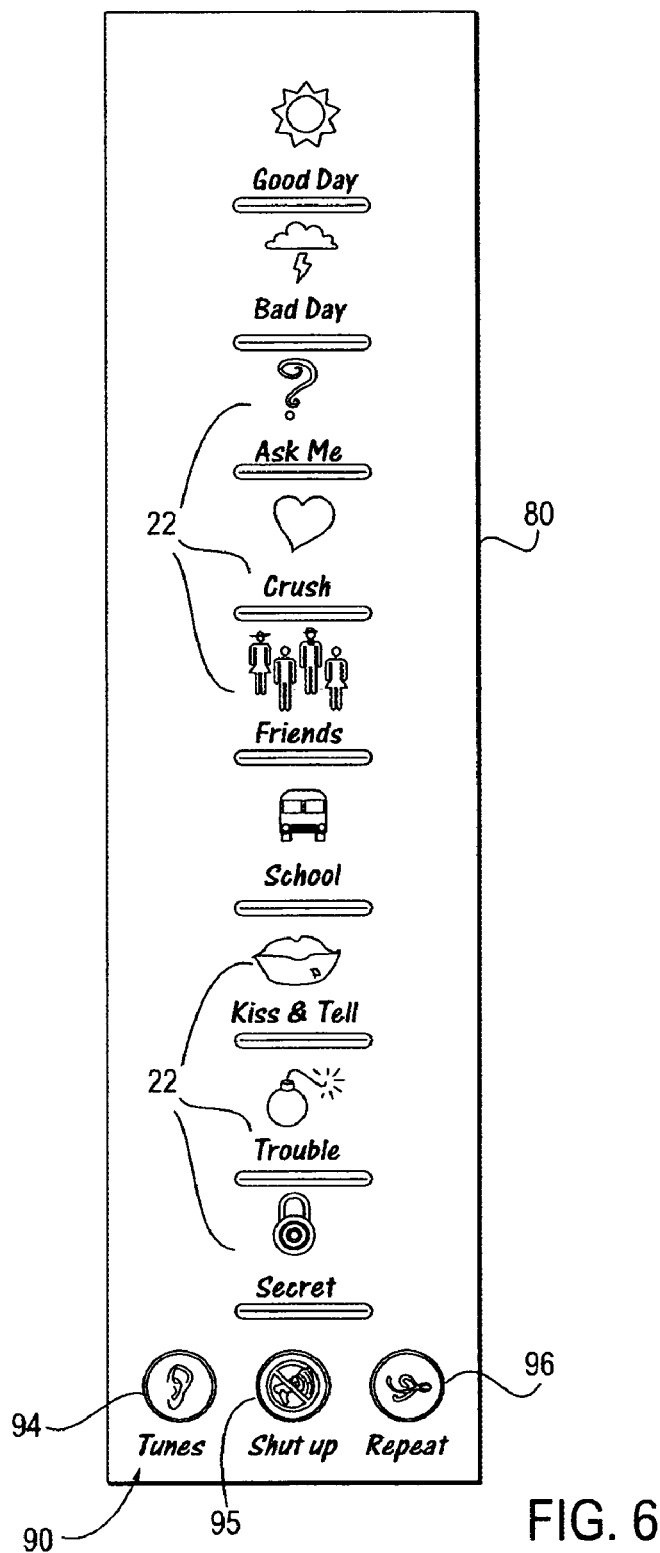
FIG. 6 illustrates a subset of category icons disposed on a bookmark.

A category icon 22 may be selected with the use of any selection device as described above. When substantially invisible codes are used, the category icons 22 may be printed on a separate sheet of paper or may be located on any surface of the journaling base 12, stylus 3 or any portion of the interactive journaling system 10. The codes are simply printed on the sheet or surface along with the category icons 22. Further, as shown in FIG. 6, a subset of category icons 22 may be disposed on a bookmark 80 or other location. This subset may be comprised of more highly used category icons 22 and therefore disposed in a location that has easier or more immediate access than the remainder of the category icons 22. For example, the bookmark 80 may be a sheet of paper that is used in the same way as a traditional bookmark, to be positioned between the pages 72 of the book 14. Thus, the user may easily access the category icons 22 on the bookmark 80 as the user is writing in the journaling system. The subset of category icons 22 may or may not be repeated in the remainder of the category icons 22 (i.e. certain category icons may be present in more than one location for ease of use).

Figure 7:
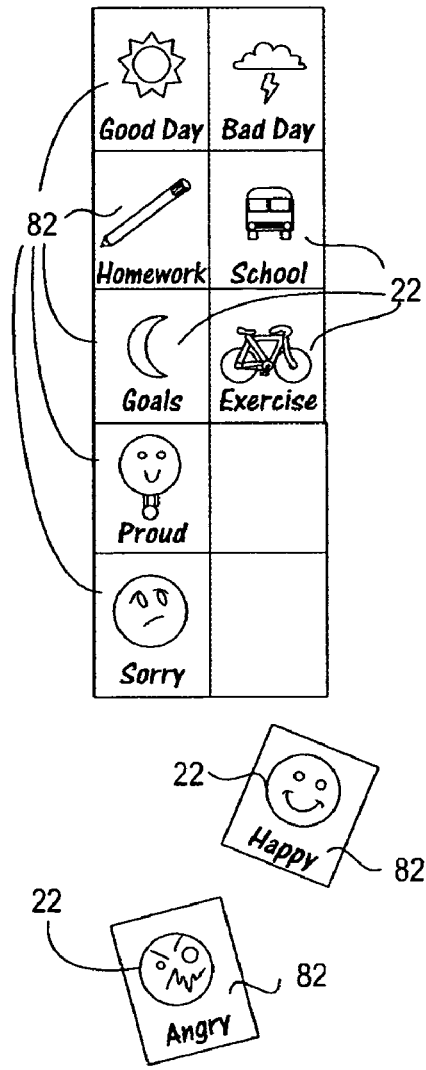
FIG. 7 illustrates category icons having the form of stickers.
Figure 8:
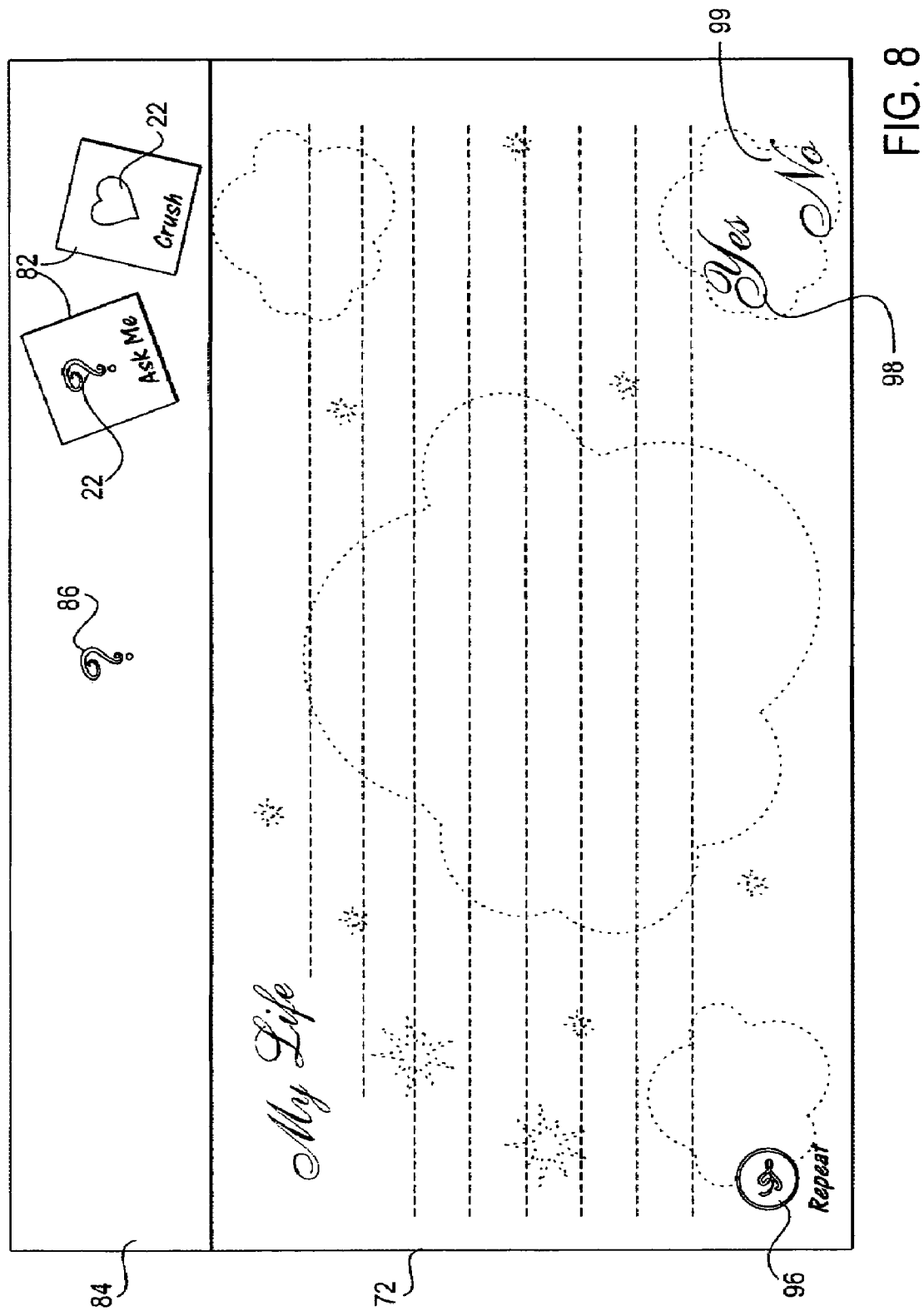
FIG. 8 illustrates an embodiment of a page of an interactive journaling system of the present invention.

Further, as shown in FIG. 7, the category icons 22 may have the form of stickers 82 wherein the icons 22 and associated substantially invisible codes are printed on a substrate having an adhesive backing. Thus, the stickers 82 may be placed on any desired surface, including on pages 72 of the book 14, on a bookmark 80, on surfaces of the journaling base 12, on surfaces of the stylus 3, or on the back of the user's hand, to name a few. For example, FIG. 8 illustrates an embodiment of a page 72 of a book 14 of an interactive journaling system 10 of the present invention. Stickers 82 having the category icons 22 representing "Ask Me" and "Crush" are shown adhered to the page 72. Thus, the user can select the category icon 22 "Crush" by scanning the code on the "Crush" sticker 82 with the stylus 3. In this embodiment, the page 72 includes a margin 84 designed for adhering stickers 82 or drawing user-generated category icons 86 (such as the question mark "?" as described above). However, it may be appreciated that any surface of the page 72 may be used for adhering stickers 82 or drawing user-generated category icons 86.

It may further be appreciated that stickers 82 may include a variety of print elements (other than category icons) and associated substantially invisible codes. For example, the stickers 82 may include print elements having the form of musical notes. The user may then hear music or a melody upon selection of the musical note. Similarly, the user may hear various sound effects when selecting various print elements, such as laughter when selecting an image of a laughing face or thunder when selecting an image of a lightening bolt. Further, the print element may indicate an additional set of questions, quizzes or the like that may be accessed by selecting the print element. By providing such print elements and category icons via stickers, the user is able to continuously acquire more features for their journaling system throughout its use.

V. Control Panel

Referring back to FIG. 5, a control panel 90 is also illustrated. The control panel 90 includes one or more control panel icons 92, such as a help icon 93, an audio-ON icon 94, an audio-OFF icon 95 and a repeat icon 96. The control panel icons 92 may be selected in the same manner as any of the category icons 22, as described above. Thus, for example, substantially invisible codes may overlay each of the control panel icons 92 so that scanning the icon 92 with the selection device within the stylus 3 may selected the desired control panel icon 92. When the help icon 93 is selected, the user may hear a menu of help topics. The menu may be a standard menu heard whenever the help icon 93 is selected, or the menu may change depending on the last activity performed with the interactive journaling system. The user may select various help topics within the menu by rescanning the help icon 93 or by scanning other print elements, such as "Yes" or "No". When the audio-ON icon 94 is selected, the audio output device 36 is able to produce sound for the user to hear. When the audio-OFF icon 95 is selected, the audio output device 36 does not produce sound for the user to hear. This may be helpful when the user would prefer to write silently so as to avoid the listening ears of nosey younger brothers. This may also be achieved with the use of an earphone or headphones (the audio output device 36 may include a speaker and/or an audio jack). When the repeat icon 96 is selected, the last sound or phrase produced by the audio output device 36 is repeated.

It may be appreciated that any number and type of control panel icons 92 can make up a control panel 90. The control panel 90 be printed on any surface in the same manner as the category icons 22, for example, on a sheet of paper or on any surface of the journaling base 12, stylus 3 or any portion of the interactive journaling system 10. FIG. 6 illustrates a control panel 90 disposed on a bookmark 80. Likewise, control panel icons 92 may have the form of stickers 82 wherein the icons 92 and associated substantially invisible codes are printed on a substrate having an adhesive backing which can be adhered to any surface. Further, as shown in FIG. 8, control panel icons 92 may be preprinted on a page 72 of the book 14 of the journaling system 10. As shown, the repeat icon 96 may be printed on each page 72 for ease of use.

VI. Article

In preferred embodiments, the interactive journaling system 10 includes at least one article 70 upon which the user is to write. Typically, the article 70 comprises pages 72 of a book 14, as illustrated in FIGS. 1A-1B. Any number of pages 72 may be present and the pages 72 may be of any suitable size, thickness and material. For example, the pages 72 may be paper based or may be a plastic film. The pages 72 may be bound together or loose as individual sheets. Referring again to FIG. 8, an embodiment of a page 72 of an interactive journaling system 10 of the present invention is shown. In this embodiment, the page 72 includes a background design and lines upon which to write. Various words or images may also be printed on the page 72, such as "My Life" as shown. The words or images may simply provide decoration, or they may be print elements. Print elements are preprinted indicia that are selectable by a selection device. Thus, they either overlay substantially invisible codes or have other means of selection. For example, FIG. 8 illustrate a "Yes" print element 98 and a "No" print element 99. After selecting a category icon 22 or a control panel icon 92, for example, the user may hear a question. The user may select the "Yes" print element 98 or the "No" print element 99 to register an answer. The interactive journaling system 10 may then provide another response based on this answer.

It may be appreciated that articles other than pages 72 may be used. Any surface that is suitable for writing may be used. For example, the article may be a three-dimensional article with a three-dimensional surface.

VII. Interactive Modes

A. "Let Me Tell You" Mode

The Let Me Tell You Mode allows the user to choose what they want to write about by selecting the journaling subject.

This is achieved by selecting a specific category icon 22, such as "Good Day", "Bad Day", "Crush", "Friends", "Brother", "School", "Proud", "Food", "Happy", or "Surprised", to name a few. If, for example, the "Crush" icon is selected, the user may hear a yes/no question, such as "Did you talk to your crush today?". The user may then select the "Yes" print element 98 or the "No" print element 99 in response. If the user selects the "Yes" print element 98, the user may hear a yes-dependent open-ended question, such as "What did you and your crush talk about?". Likewise, if the user selects the "No" print element 98, the user may hear a different no-dependent open-ended question, such as "That's too bad. If you were to talk to him, what would you say?". The user may be asked any number of yes/no questions prior to being asked an open-ended questions or the user may be asked an open-ended question without any prior yes/no questions. After the user has been prompted with an open-ended question, the user may choose to write in response to this question or choose another question. To choose another question, the user simply reselects the same category icon, in this example the "Crush" icon. Alternatively, the user may select a Next print element that is pre-printed on a page 72, on a sticker 82, or on any surface of the system 10. The user may then hear a different open-ended question, such as "How do you feel whenever your crush is around?". This may be repeated any number of times. In some embodiments, the user may alternatively hear another yes/no question.

Once the user has heard an open-ended question that the user would like to write about, the user may write on the pages 72 of the interactive journaling system for any length of time. To signal that the user has finished writing and would like another prompt, the user may reselect the same category icon 22, may select a period written at the end of their last sentence, may select a Next print element that is pre-printed on a page 72, on a sticker 82, or on any surface of the system 10, may create or select a user-generated graphic element (such as a checkmark), or may select any other print element indicating that the user has finished writing, to name a few. The user will then be prompted with another question on the same journaling subject. The prompt may be a yes/no question or an open-ended question. This pattern may continue to create a wide variety of journaling experiences for the user. It may be appreciated that at any time the user may select a different category icon 22 to switch to a different category topic.

Figure 9:
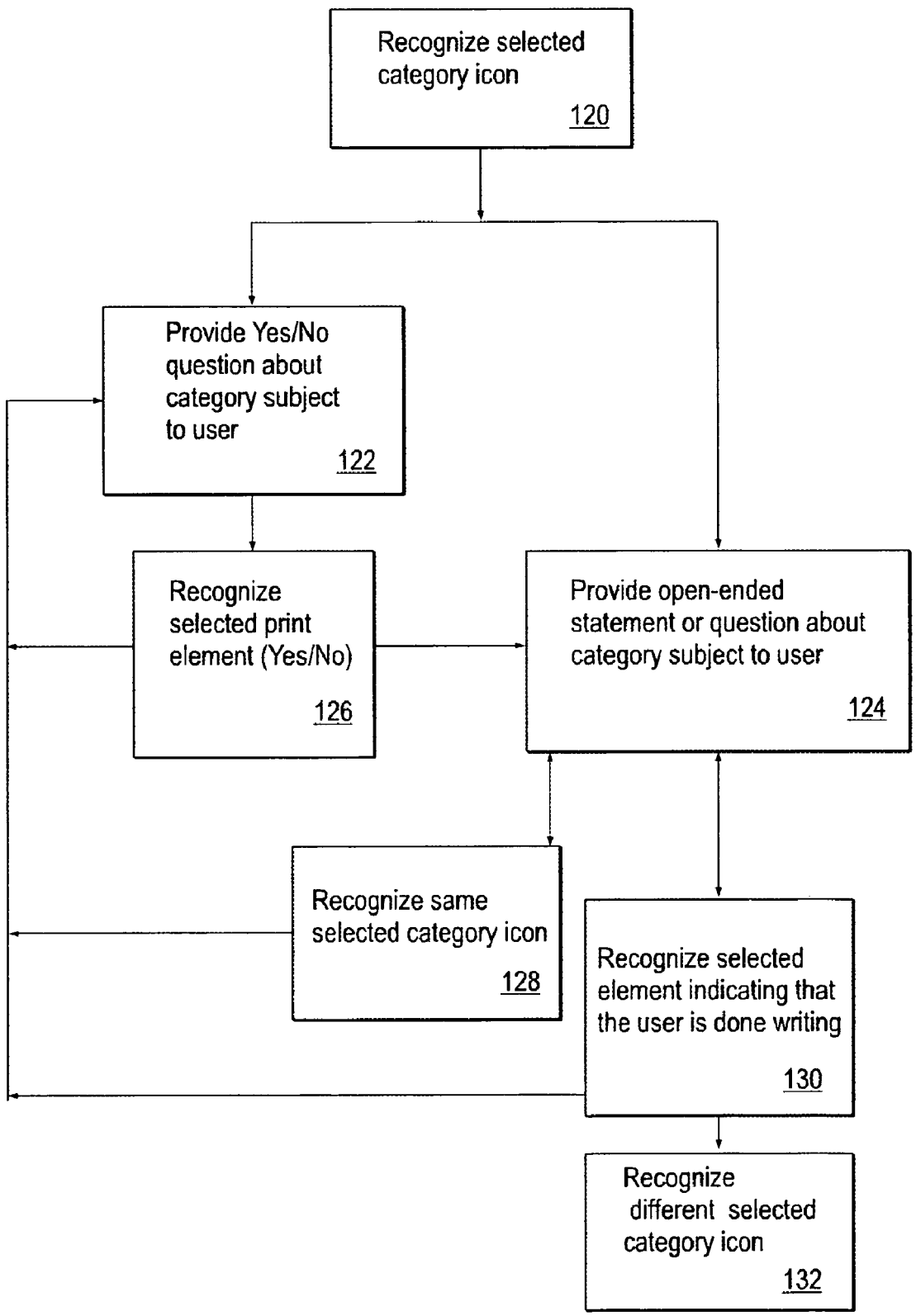
FIGS. 9-10 show flowcharts illustrating methods according to embodiments of the invention.

FIG. 9 shows a flowchart illustrating a method according to an embodiment of the invention. The flowchart illustrates a variety of steps that the interactive journaling system 10 may provide in the "Let Me Tell You" mode. As a first step, the interactive journaling system 10 recognizes a selected category icon 120. The category icon 22 is selected by the user with the use of any of the selection devices described above. The system 10 then may provide a Yes/No question about a category subject to the user 122, the category subject being related to the category icon 22. Alternatively, the system 10 may provide an open-ended question about the category subject to the user 124. If a Yes/No question about a category subject is provided to a user 122, the system 10 then recognizes a selected print element (Yes/No) 126. The system 10 may then provide another Yes/No question about a category subject to a user 122 or may provide an open-ended question about the category subject to the user 124. After an open-ended question is provided, the system 10 may recognize the same selected category icon 128 or may recognize a selected element indicating the user is done writing 130. In either case, the system 10 may then provide another Yes/No question about a category subject to a user 122 or may provide an open-ended question about the category subject to the user 124. Or, once the system 10 has recognized a selected element indicating the user is done writing 130, the system 10 may recognize a different selected category icon 132. It may be appreciated that the system may recognize a different selected category icon 132 at any time.

B. "Ask Me" Mode

The Ask Me Mode allows the interactive journaling system 10 to suggest a topic for the user to write about. This is achieved by selecting a specific category icon 22, the "? Ask Me" category icon. When the "? Ask Me" category icon is selected, the user hears a random open-ended question, such as "What do you like the best about your personality", "What do you think is the most beautiful thing about you?", "If you could interview anyone, who would it be and what would you ask them?", "If you were a rock star, what would you wear?", "Where would you love to live?", "What is your biggest talent?", to name a few. After the user has been prompted with the open-ended question, the user may choose to write in response to this question or choose another question. To choose another question, the user simply reselects the "? Ask Me" category icon. Or, the user may select a Next print element that is pre-printed on a page 72, on a sticker 82, or on any surface of the system 10. This may be repeated any number of times. Once the user has heard an open-ended question that the user would like to write about, the user may write on the pages 72 of the interactive journaling system for any length of time. To signal that the user has finished writing and would like another prompt, the user may reselect the same category icon 22, may select a period written at the end of their last sentence, may select a Next print element that is pre-printed on a page 72, on a sticker 82, or on any surface of the system 10, may create or select a user-generated graphic element (such as a checkmark), or may select any other print element indicating that the user has finished writing. The user will then be prompted with another question, however it may be appreciated that at any time the user may select a different category icon 22 to switch to a different category topic.

C. "Guided Support" Mode

The Guided Support Mode allows the user to write on a journaling topic with guidance from the interactive journaling system 10. Such guidance may help the user set goals, work through challenges, manage moods and develop good life skills. A variety of specific category icons 22 may be used to enable the Guided Support mode.

For example, for guidance in setting goals, the user may select a "Goals" category icon. When the "Goals" category icon is selected, the user may hear a series of related questions which may include Yes/No questions, open-ended questions and questions which ask the user to write down a series of steps or goals. For example, upon selection of the "Goals" category icon, the user may hear "Cool! You can do it! What do you want to accomplish?". The user may then write on the pages 72 of the interactive journaling system for any length of time. To signal that the user has finished writing and would like another prompt, the user may reselect the same category icon 22, may select a period written at the end of their last sentence, may select a Next print element that is pre-printed on a page 72, on a sticker 82, or on any surface of the system 10, may create or select a user-generated graphic element (such as a checkmark), or may select any other print element indicating that the user has finished writing, to name a few. The user may then hear another prompt, such as "Gimme more details! Tell me a little more about what you want to achieve!".

The user may also hear a prompt asking the user to write down a series of steps or goals, such as "Break it down! Lots of little steps are always easier to take than one big step. Tell me the small steps that you need to take. Start with writing a number one followed by your first step." The user then writes a number one on a page 72, thus creating a user-generated graphic element symbolizing step one. The interactive journaling system 10 then recognizes the user-generated graphic element as a number one with character recognition software. The user may then hear a prompt asking the user to write down the next step in the series of steps or goals, such as "That's a great start! Now, write down a number 2 followed by your second step". Thus, the user then writes a number two on a page 72, creating a user-generated graphic element symbolizing step two. Again, the interactive journaling system 10 then recognizes the user-generated graphic element as a number two with character recognition software. This pattern may be repeated for any number of steps. The user may also hear a variety of other prompts, such as "Set a date! When are you going to take the first step?" or "That's awesome! I'll be checking in with you!". In some embodiments, the interactive journaling system 10 includes a timer so that the user hears a prompt after a specific interval of time related to a goal that has been set. In addition, the system 10 may keep track of which goals have been achieved and may prompt the user in relation to the goals which remain at any given time.

Figure 10:
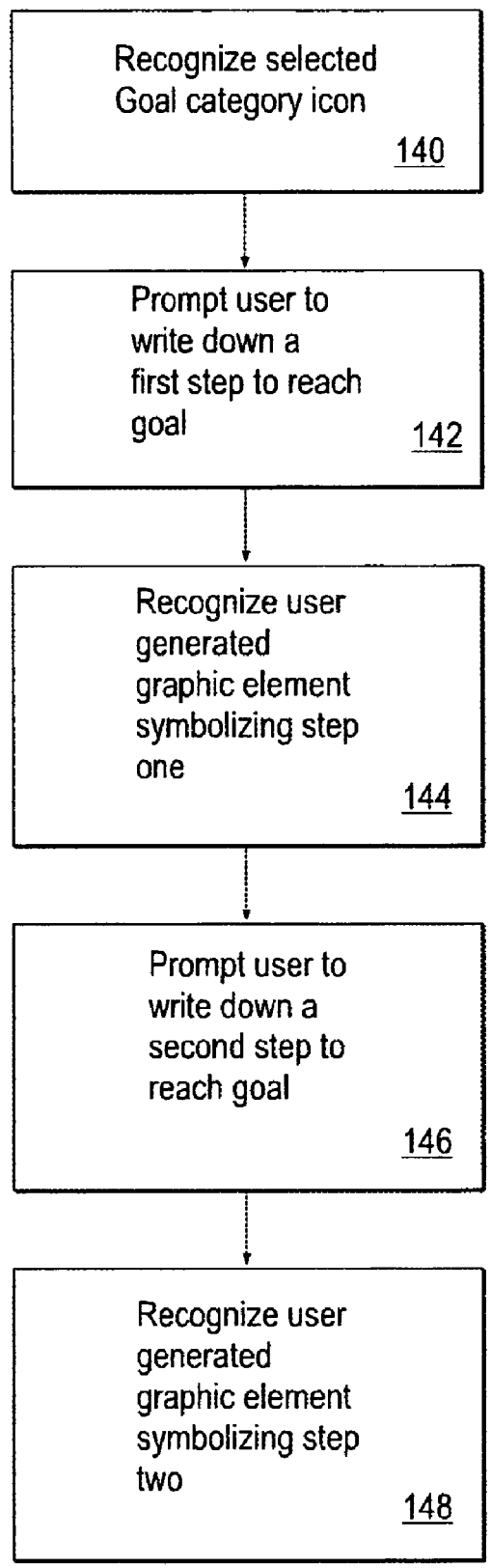

FIG. 10 shows a flowchart illustrating a method according to an embodiment of the invention. The flowchart illustrates a steps that the interactive journaling system 10 may provide in the "Guided support" mode. As a first step, the interactive journaling system 10 recognizes a selected Goal category icon 140. The Goal category icon is selected by the user with the use of any of the selection devices described above. The system 10 then prompts the user to write down a first step to the reach the goal 142. Then the system 10 recognizes a user generated graphic element symbolizing step one 144. The system 10 may then prompt the user to write down a second step to the reach the goal 146 followed by recognizing a user generated graphic element symbolizing step two 148. This pattern may be repeated any number of times through any number of steps.

For guidance in mood management, the user may select a category icon 22 which reflects a mood, such as "Depressed", "Overwhelmed", "Angry", "Worried" or "Crying". When, for example, the "Crying" category icon is selected, the user may hear a series of related questions which may include Yes/No questions and open-ended questions which lead the user through a series of steps to manage the user's feelings. For example, upon selection of the "Crying" category icon, the user may hear "Ooh, I'm sorry to hear that you are upset. I have a little trick to feel better that usually works, do you want to hear it?". If the user selects the "Yes" print element, the user may then hear a series of statements and questions, such as "When I feel bad, I try to remember a few things that are good in my life. What are two things that you're grateful for?". The user may then write on the pages 72 of the interactive journaling system 10 for any length of time. To signal that the user has finished writing and would like another prompt, the user may reselect the same category icon 22, may select a period written at the end of their last sentence, may select a Next print element that is pre-printed on a page 72, on a sticker 82, or on any surface of the system 10, may create or select a user-generated graphic element (such as a checkmark), or may select any other print element indicating that the user has finished writing. The user may then hear another prompt, such as "Is there something that you're looking forward to?". If the user selects the "Yes" print element, the user may then hear a related statement, such as "What is it?", and if the user selects the "No" print element, the user may then hear a related statement, such as "Why don't you tell me what's bugging you?". Thus different questioning patterns may be provided guiding the user through any number of steps.

VIII. Additional Features

A. Personalization

In some embodiments, the interactive journaling system 10 can be personalized to the individual user. For example, a category icon 22, such as a "Me" category icon, may be provided so that selection of the "Me" category icon allows the user to input personal information into the system 10. When the "Me" category icon is selected, the user may hear a series of related questions which may include Yes/No questions and/or open-ended questions, such as "What is your name?', "How old are you?", "When is your birthday?", "How many sisters do you have?", "What is your oldest sister's name?", "Do you have any pets?", to name a few.

Answers to these questions may be input to the system 10 by character recognition as the user writes with the stylus 3, by voice recognition as the user speaks into a recorder within the system 10, or by any other suitable method. The answers provided by the user may then be utilized to personalize the interaction of the user with the journaling system 10. For example, when the user turns on the power to the system 10, the user may hear a personalized welcome message, such as "Hello Ashley!". Or, when the user selects the "Sister" category icon, the user may hear a question such "What is happening with Emily today?". Alternatively, certain questions may be blocked due to the answers provided by the user. For example, if the user has entered that they do not have any brothers, questions related to brothers are not asked. The personalized information may be updated at any time, for example by reselection of the "Me" category icon.

The interactive journaling system 10 can also be personalized throughout the use of the journaling system 10. For example, when the "Crush" icon is selected the user may hear a series of questions related to a romantic crush. One such question may include "What is the name of your crush?" or "What is the code name that you use for your crush?". Once the user has entered the name or code name, the crush may then be referred to by name in future sessions. This may be particularly useful when the user has more than one crush or when crushes change frequently. Likewise, the system 10 may remember the status of the crush interactions from one session to a subsequent session. For example, if the last response from the user was "No" when asked if they had spoken with their crush, the next time the "Crush" category icon is selected the user may be asked a relevant question, such as "So have you talked to Jacob yet???". Such personalization of the system may apply to any category icon 22 or other method of input by the user.

B. Locking

In some embodiments, the base 12, stylus 3 or any other portion of the interactive journaling system 10 may be "locked" to prevent unauthorized users from using the system 10. This is a particularly desirable feature in embodiments wherein the system 10 is capable of storing personalized information which has been inputted by the user or recognized from writings by the user on the pages of the journaling system 10. Thus, the locking feature may reduce the incidence of potential "snooping".

For example, when the interactive journaling system 10 is first accessed or turned on, the user may be requested to provide a password. The password may be provided by the user in a variety of forms. For example, the password may be provided by the user writing the password on a page 72 or other surface of the interactive journaling system 10 wherein the password is recognized by the system 10 using character recognition. Or, the password may be provided by manually entering a code into the stylus 3, base 12 or any other location on the system 10. Such entering may be achieved by pressing buttons, turning knobs or wheels, moving sliders, etc. Or, the password may be provided verbally by the user to a microphone. These are just a few examples of methods that may be used. If the correct password is not provided, the user may hear a statement such as "Put down this journal and step away! You are not authorized to read this!".

Thus, in some embodiments the interactive journaling system 10 is operationally lockable. In other embodiments, the system 10 is physically lockable wherein the system 10 includes a physical lock which may be unlocked by the user entering a secret number, code or password. The physical lock may prevent opening of the journaling system 10 for viewing of the pages 72, may prevent disengagement of the stylus 3 from the holder 16 or may provide any other prevention of use of the system 10.

C. Time Memory

In some embodiments, the interactive journaling system 10 includes a clock, timer or other device which provides time memory. Thus, for example, if the user has not turned on the system 10 for a given period of time, when the user next turns on the system they may hear a greeting such as "It's been a really long time, I've missed you! What's new?". Or, for example, if the user is writing with the stylus for a long period of time, the user may hear a statement such as "Man you have a lot to say!". Further, the time memory feature may be used in the Guided Support Mode. For example, if the user has set goals in a previous session with the journaling system 10, the system 10 may remember the goals which have been set, the latest step toward the goal that has been completed, the time that has elapsed since the last step was completed and the time remaining until the next step is planned to be completed. When the user selects the "Goals" category icon, the user may hear a prompt such as "Only two days left until your class presentation. How are things coming along?". Thus, the time memory feature may help the user develop time management skills.

D. Quizzes

In some embodiments, the interactive journaling system 10 includes quizzes that the user may take to, for example, learn more about themselves, to determine if they have a problem, to affirm their beliefs or for mere entertainment. Such quizzes may be accessed by selecting a "Quiz" category icon. The user may then hear a variety of quiz topics to choose from, such as "Are You a True Friend?", "Are You a Drama Queen?", "Are You Too Hard on Yourself?", "Do You Have an Eating Disorder?", "Can You Keep a Secret?", "Are You Completely Boy-Crazy?", "How Wild Is Your Imagination?", and "Are You Obsessed with Appearances?", to name a few. When the user hears a topic of interest, the user may select the topic by, for example, selecting the "Yes" print element. The user will then hear a series of multiple choice questions. Each question will have a question number and a series of answer choices, each answer choice having a corresponding letter. The user may write the question number and letter corresponding to their answer on a page 72 of the journaling system 10. The selection device recognizes the question numbers and letters written by the user. Thus, the system 10 is able to tabulate the results of the quiz and provide a message corresponding to the results.

A variety of quizzes may be pre-programmed into the memory unit. In addition, the user may acquire additional quizzes for use with the system 10. For example, the user may download additional quizzes onto the memory unit from a website on the internet. Or, additional quizzes may be supplied by additional memory units which may be used in conjunction with the system 10.

E. Recording Feature

In some embodiments, the interactive journaling system 10 includes a recording device. The recording device may be disposed within the journaling base 12, the stylus 3 or any other component of the system 10. The recording device may be used to record the voice of the user for playback by the output device. Alternatively or in addition, the recording device may be used to input information into the system 10. The system 10 may include voice recognition to identify such auditory inputs made by the user. For example, when the user is taking a quiz, as described above, the user may say the letter corresponding to their answer choice, rather than writing their answer choices on the page 72 of the journaling system 10. The verbalized answers are recorded by the recording device, recognized by voice recognition and tabulated to determine the results of the quiz. The system 10 then provides a message corresponding to the results.

F. Celebrity Personality Packs

The journaling system 10 of the present invention may include a variety of references to celebrity figures. For example, when the journaling base 12 has the form of a book 14 having a front cover 14a and a back cover 14b, the covers 14a, 14b may include photographs of a particular celebrity, such as Hilary Duff, Lizzie McGuire, Aaron Carter, or Mary Kate and Ashley Olsen, to name a few. Audio outputs provided by the system 10 may also be in the voice of the celebrity that is pictured on the covers 14a, 14b. It may be appreciated the such references to celebrities are merely exemplary and a variety of references may be provided.

G. Scrapbooking

The journaling system 10 of the present invention may include a variety of features which allow the user to alternatively or additionally use the system 10 as a scrapbook. A traditional scrapbook is typically a book with blank pages used for the mounting and preserving of photographs, clippings or other mementos. The journaling system 10 may be used for scrapbooking by adhering such mementos to the pages 72 of the book 14. Further, in some embodiments, the system 10 includes one or more photo sleeves wherein the user may insert photos into the photo sleeves for viewing. It may be appreciated that such sleeves may be present on any of the pages 72 or may be separate pages devoted exclusively to photos. Still further, the system 10 may include photo frames which may be mounted on any of the pages 72 or may be inserted into any of the photo sleeves. The photo sleeves and/or the photo frames may include associated substantially invisible codes. Upon selection of the associated substantially invisible codes, the user may hear a song, sound effect, saying or caption, such as "Party Girls" or "What a hottie!". It may be appreciated that such substantially invisible codes may alternatively be disposed on stickers which may be adhered to the pages 72, photo sleeves, photo frames or any other surface of the system 10.

Although the foregoing invention has been described in some detail by way of illustration and example, for purposes of clarity of understanding, it will be obvious that various alternatives, modifications and equivalents may be used and the above description should not be taken as limiting in scope of the invention which is defined by the appended claims.

What is claimed is:

1. A method comprising:
   recognizing a user selection of at least one selected category icon from a plurality of category icons wherein the at least one selected category icon comprises a journaling subject that indicates a stepped process and wherein said user selection is made with a selector disposed at a first end of a stylus housing of an interactive journaling system and operatively coupled to a processor inside of the stylus housing;

generating an a first output comprising a prompt to create, with the selector, a user generated graphic element symbolizing a step of the stepped process;

recognizing the user generated graphic element;

identifying a user selection of the user generated graphic element with the selector; and generating a second output that prompts the user to write a step of the stepped process associated with the user generated graphic element in response to said user selection of the user generated graphic element, wherein the second output provides guidance in the journaling subject.

2. A method as in claim 1, wherein the user generated graphic element comprises a number representing a step number of the stepped process and wherein the number is selected from the group consisting of one, two , three, four, and five.

3. A method as in claim 1, further comprising generating an output comprising a prompt to create another user generated graphic element symbolizing a next step of the stepped process.

4. A method as in claim 3, further comprising:
recognizing the another user generated graphic element;
identifying a user selection of the another user generated graphic element with the selector; and
generating an output comprising a prompt to write the next step of the stepped process associated with the another user generated graphic element in response to said user selection of the another user generated graphic element.

5. A method as in claim 4, wherein the user generated graphic element comprises the number one and the another user generated graphic element comprises the number two.

6. A method as in claim 1, wherein the at least one category icon comprises a goal category icon and the stepped process comprises steps to achieve a goal.

7. A method as in claim 1, wherein the user generated graphic element comprises a checkmark.

8. An interactive journaling system comprising:
a stylus housing;
a processor inside of the stylus housing;
a selector disposed at a first end of the stylus housing and operatively coupled to the processor, wherein the selector is used to select both a category icon that comprises a journaling subject indicating a stepped process, and a user generated graphic element;
a memory unit within the stylus housing and operatively coupled to the processor, the memory unit comprising (i) computer code for recognizing the selection of the category icon indicating a stepped process, (ii) computer code for generating at least one output configured to prompt the user to create, with the selector, the user generated graphic element, the user generated graphic element symbolizing a step of the stepped process, (iii) computer code for recognizing the user generated graphic element, (iv) computer code for identifying the selection of the user generated graphic element with the selector, and (v) computer code for generating an output that prompts the user to write a step of the stepped process, wherein the output provides guidance in the journaling subject; and
an output device in the stylus housing and operatively coupled to the processor.

9. The system as in claim 8, wherein the user generated graphic element comprises a number representing a step number of the stepped process and wherein the number is selected from the group consisting of one, two , three, four, and five.

10. The system as in claim 8, wherein the at least one category icon comprises a goal category icon and the stepped process comprises steps to achieve a goal.

11. The system as in claim 8, wherein the stepped process comprises a series of steps, and further wherein the memory unit comprises computer code for providing two or more outputs, wherein each output prompts the user to write a step in the series of steps of the stepped process.

* * * * *